United States Patent [19]

Lisec

[11] Patent Number: 5,542,805
[45] Date of Patent: Aug. 6, 1996

[54] DEVICE FOR MOVING PLATE-SHAPED ARTICLES

[76] Inventor: Peter Lisec, Bahnhofstrasse 34, A-3363 Amstetten-Hausmening, Austria

[21] Appl. No.: 382,187

[22] Filed: Feb. 1, 1995

[30] Foreign Application Priority Data

Mar. 28, 1994 [AT] Austria .................................... 663/94

[51] Int. Cl.$^6$ .................................................. B65G 1/18
[52] U.S. Cl. ........................ 414/280; 414/277; 414/752
[58] Field of Search ................................ 414/277, 279, 414/280, 752, 416

[56] References Cited

U.S. PATENT DOCUMENTS

| | | | |
|---|---|---|---|
| 2,628,453 | 2/1953 | Pye et al. | 414/752 X |
| 3,881,618 | 5/1975 | Tausheck | 414/752 X |
| 4,383,789 | 5/1983 | Takamatsu | 414/279 X |
| 4,462,742 | 7/1984 | Hradel | 414/280 |
| 4,541,766 | 9/1985 | Dahl | 414/277 |
| 4,735,539 | 4/1988 | Häkkinen et al. | 414/277 X |
| 4,884,938 | 12/1989 | Fujita et al. | 414/752 X |
| 5,209,627 | 5/1993 | Lisec | 414/398 |
| 5,375,959 | 12/1994 | Trento | 414/277 |

FOREIGN PATENT DOCUMENTS 1431710  3/1969  Germany .................................. 414/752

Primary Examiner—James W. Keenan
Attorney, Agent, or Firm—Young & Thompson

[57] ABSTRACT

A device for removing plate-shaped articles (22), especially glass panes, which are piled standing roughly vertically in compartments (2), has a tilting table (8) which can be moved next to the compartments (2) transversely to the orientation of the compartments (2). On the tilting table (8) in the area of the upper longitudinal edge of its support wall (13), a beam (11) is supported which can be moved lengthwise on the support wall (13). Beam (19) can be moved into compartments (2), and on beam (19) are vacuum suction boxes (21). To remove one pane of glass (22), beam (19) is pushed into a corresponding compartment (2) and tilting table (8) is swivelled subsequently until vacuum suction boxes (21) engage the pane of glass (22). The tilting table (8) is then swivelled back again until the pane of glass (22) hangs freely on beam (19) and then the beam (19) with its suspended pane of glass (22) is withdrawn from compartment (2). The reverse operation can be followed to pile glass panes (22) in the compartments (2).

5 Claims, 2 Drawing Sheets

DEVICE FOR MOVING PLATE-SHAPED ARTICLES

FIELD OF THE INVENTION

The invention relates to a device for moving plate-shaped articles, especially glass panes, which are piled standing roughly vertically on a frame.

BACKGROUND OF THE INVENTION

Piling plate-shaped articles, especially glass panes standing roughly vertically on frames, support walls, and the like which are sloped roughly 6° to 8° from the vertical to the rear is known. In doing so not only a single pane of glass, but also several panes of glass can be piled on the frame. In particular, when several glass panes are piled on the frame and the space is limited in front of the frame, removing a single glass pane poses problems.

The problem of the invention is to make available a device with which plate-shaped articles, especially glass panes, can be easily removed individually from or deposited on a frame.

SUMMARY OF THE INVENTION

This problem is solved in a generic device by the device having a tilting table which is located next to the frame, by the tilting table in the area of the upper longitudinal edge of its support wall having a beam which is movably supported in the direction of its longitudinal extension on the support wall, by the beam being able to move in front of the frame, and by there being vacuum suction boxes on the beam.

The beam with the vacuum suction boxes can be pushed from the side to in front of the frame; the vacuum suction boxes are joined on the frontmost glass pane; the latter is then raised from the pile of panes and removed laterally from the frame. The glass pane can then be delivered essentially either standing vertically or, after the tilting table has been moved into its horizontal position, horizontally to another handling station, for example, a cutting table or a conveyor means.

Preferably the device is used according to the invention for removing glass panes from compartments which are arranged in succession and which are bounded by roughly vertically standing frames. The device according to the invention can therefore be developed by piling the plate-shaped articles in compartments formed between frames, by the tilting table being able to move next to the compartments transversely to the orientation of the compartments, and by the beam being able to move into the compartments. Using this device individual glass panes can be removed from any compartment.

BRIEF DESCRIPTION OF THE DRAWINGS

Other features and advantages of the invention follow from the subclaims and the following description of one embodiment of the invention with reference to the drawings.

DETAILED DESCRIPTION OF THE INVENTION

Figure 1:
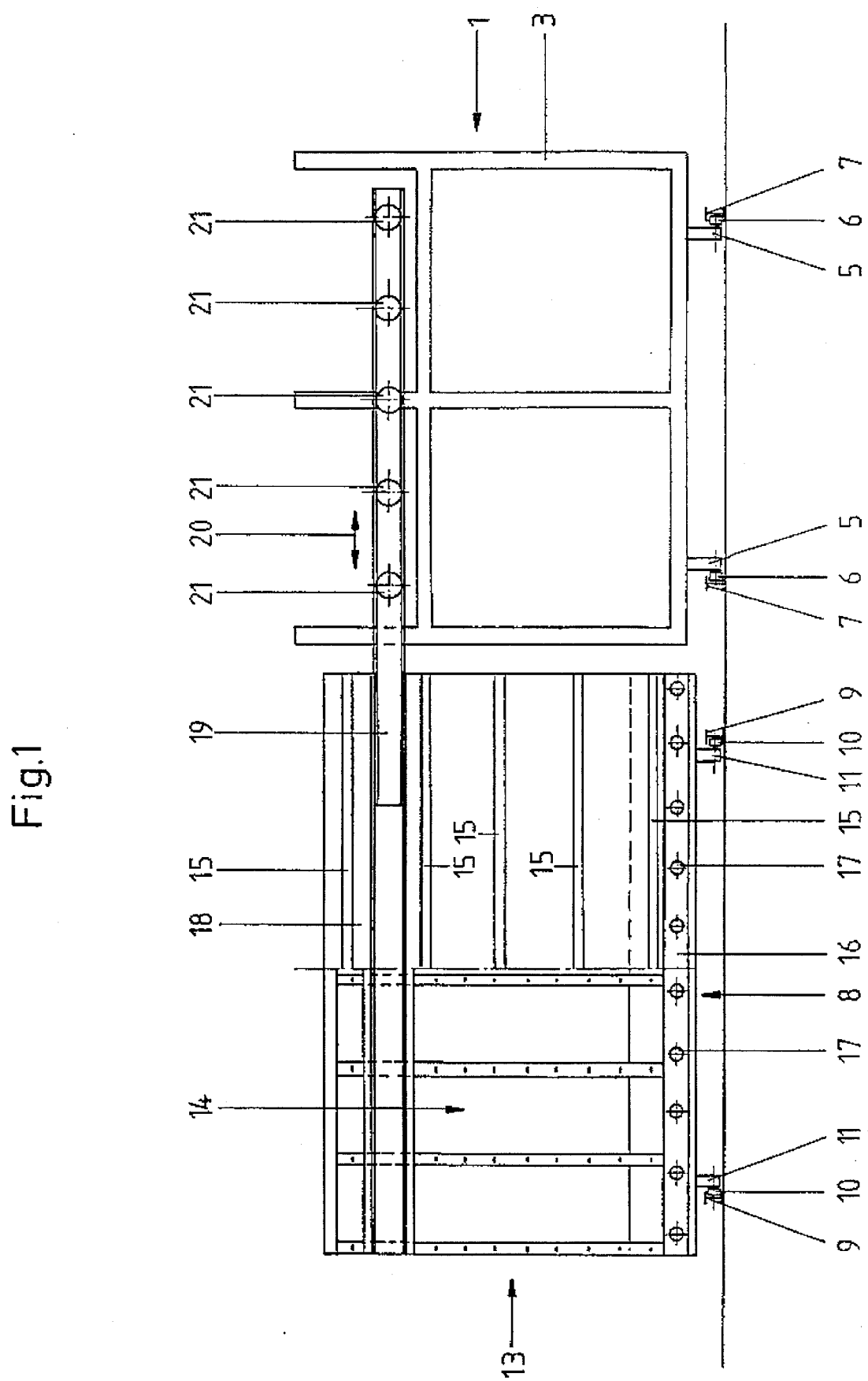
FIG. 1 shows a front view of the device according to the invention.
Figure 2:
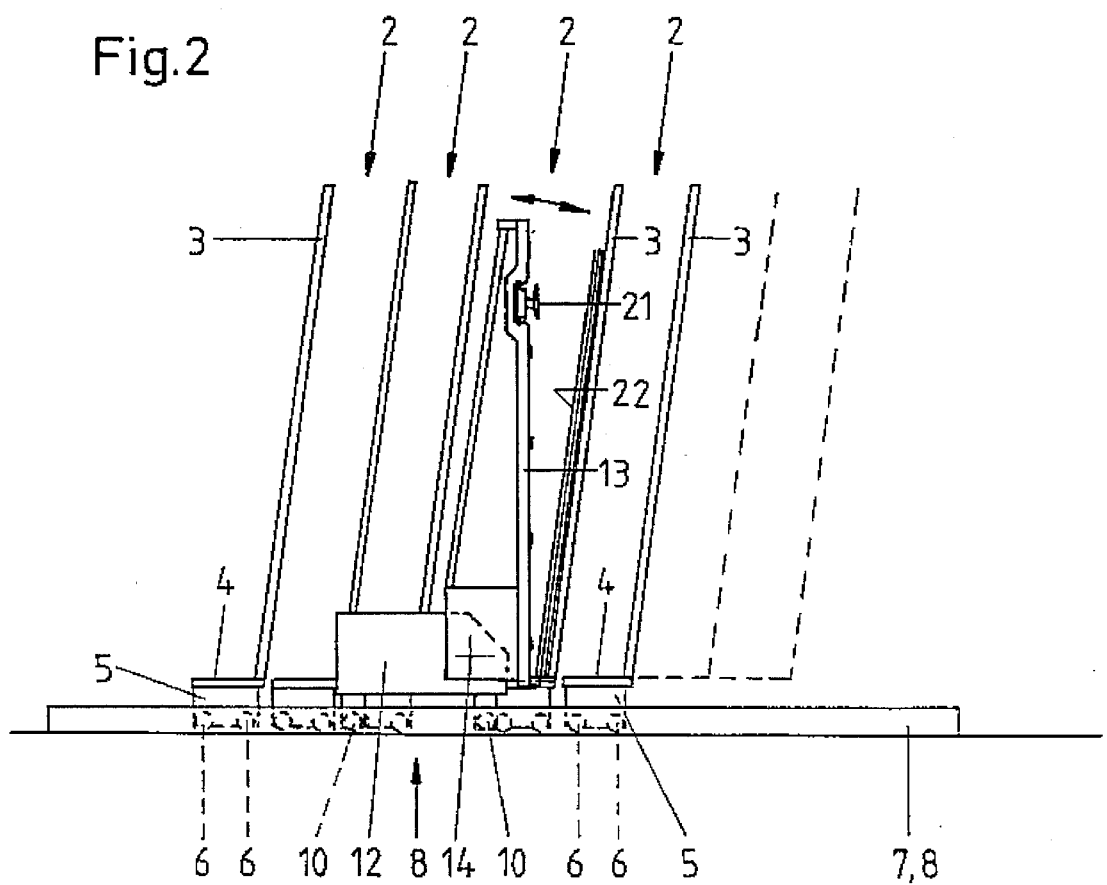
FIG. 2 shows a view of the device of FIG. 1 from the left.

FIGS. 1 and 2 show magazine 1 which has several successive compartments 2. Each compartment 2 has a rear wall formed by frame 3 and rest 4 on which glass panes 22 stand sloped roughly 6° to 8° from the vertical. Rests 4 can be formed for example by support rollers with essentially horizontal axles.

Under rests 4 each frame 3 has one pair of supports 5 on which rollers 6 are supported in pairs. Rollers 6 run in rails 7 which are anchored tight to the floor. This arrangement makes it possible to increase the distance between adjacent frames 3 via suitable drives so that removal of glass panes is facilitated. Adjustment of the distance between two adjacent frames of compartments 2 can be done for example via pinions supported on frame 3 which fit into a stationary rack, or via hydraulic cylinders, a hydraulic cylinder always connecting two adjacent frames 3 to one another.

Next to compartments 2 tilting table 8 can move on rails 9 which run parallel to rails 7 of magazine 1. Tilting table 8 has support structure and substructure 12 on which rollers 10 are supported in pairs via supports 11, the rollers rolling on rails 9. On substructure 12 support wall 13 is supported to swivel around swivel axis 14 from the horizontal by more than 90°, preferably roughly 110°. The swivel drive of support wall 13 on substructure 12 of tilting table 8 can for example be effected by hydraulic cylinders.

As is shown in FIG. 1 on the left half of support wall 13, the latter can be formed either by support rollers 17 or conveyor belts 15, as is shown on the right half of support wall 12. On rear longitudinal edge 16 of support wall 13 are the support rollers 17 with axles oriented at a right angle to support wall 13. The support rollers can likewise be driven.

Figure 3:
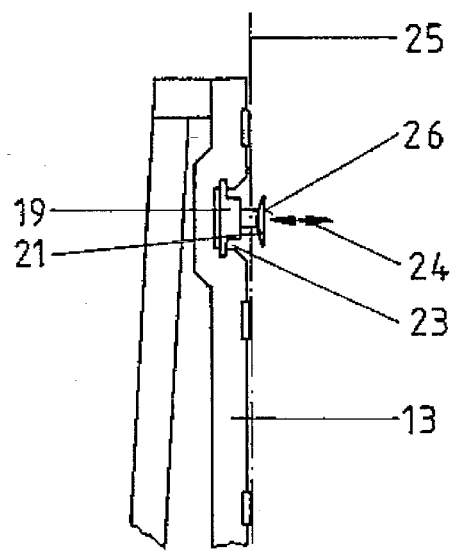
FIG. 3 shows a section through the support wall in the area of the frame on an enlarged scale.

In the area of upper longitudinal edge 18 of support wall 13 beam 19 is supported to move in the direction of arrow 20. On beam 19 are vacuum suction boxes 21 by which one glass pane 22 at a time can be removed from one of compartments 2. To move beam 19 along double arrow 20, for example a hydraulic cylinder, a rack and pinion gear, or the like which is not shown can be used. Beam 19 is movably supported in groove 23 in support wall 13 in the direction of its longitudinal extension. Vacuum suction boxes 21 in turn are arranged adjustably in the direction of double arrow 24 on beam 19 so that they can be moved into a position in which their suction surface 26 is flush with support plane 25 from the position shown in FIG. 3 in which they lie in front of support plane 25 defined by support rollers 17 or conveyor belts 15.

The device according to the invention operates for example as follows:

To remove glass pane 22 from compartment 2 the width of desired compartment 2 is increased by increasing the distance of frame 3 which borders compartment 2. Then tilting table 8 is moved next to this compartment 2 and support wall 13 is swivelled up roughly into a vertical position, as shown in FIG. 2. At this point beam 19 is pushed into compartment 2, as shown in FIG. 1. Support wall 13 is then swivelled further in FIG. 2 clockwise until vacuum suction boxes 21 which have been pushed out of support plane 25 of support wall 13 lie against frontmost glass pane 22, whereupon negative pressure is applied to vacuum suction boxes 21. Then support wall 13 is again swivelled counterclockwise until glass pane 22 hangs freely down and vacuum suction boxes 21 are withdrawn until glass pane 22 lies against support wall 13. Since support wall 13 or its support plane 25 in this position is spaced horizontally from swivel axis 14 of tilting table 8, glass pane 22 when swivelled is raised automatically into the vertical position roughly from rest 4.

Beam 19 at this point is again withdrawn from the compartment with glass pane 22 hanging on it (in FIG. 1 to the left) until glass pane 22 is completely on support wall 13 of tilting table 8. Depending on whether glass pane 22 at this point is to continue to be conveyed in a roughly vertical position or lying flat in the horizontal position, support surface 13 is turned over either into a position tilted roughly 6° to 8° to the rear or completely into the horizontal position. Then tilting table 8 is moved either to another conveying means or to a handling station and the glass pane is transferred to it.

Of course the device according to the invention can be used not only to remove glass panes 22 from compartments 2, but also to pile glass panes 22 in them.

One special advantage which arises in the device according to the invention in the removal of glass panes 22 is that glass pane 22 is gripped by vacuum suction boxes 21 in the area of its upper longitudinal edge and is also first raised there from the pile of glass panes. In this way an air wedge is formed from which air can penetrate between glass pane 22 to be removed and underlying glass pane 22 so that uppermost glass pane 22 does not remain "sticking" to glass pane 22 located under or next to it.

To be able to use this advantage even for glass panes of different heights, according to one embodiment of the invention not shown in the figures it can be provided that the distance of beam 19 from lower support rollers 17 on support wall 13 can be changed in order to allow vacuum suction boxes 21 to always act in the area of the upper edge of glass pane 22 to be removed.

In summary the invention can be described as follows by way of example:

A device for removing plate-shaped articles 22, especially panes of glass, which are piled standing roughly vertically in compartments 2, has tilting table 8 which can be moved next to compartments 2 transversely to the orientation of compartments 2. On tilting table 8 in the area of the upper longitudinal edge of its support wall 13 beam 11 is supported which can be moved in the direction of its longitudinal extension on support wall 13. Beam 19 can be moved into compartments 2 and on beam 19 there are vacuum suction boxes 21.

To remove one pane of glass 22 beam 19 is pushed into corresponding compartment 2 and tilting table 8 is swivelled subsequently until vacuum suction boxes 21 engage pane of glass 22. Tilting table 8 is then swivelled back until pane of glass 22 hangs freely on beam 19 and then beam 19 with pane of glass 22 is withdrawn from compartment 2.

I claim:

1. In combination with an upright frame (3), a device for moving plate-shaped articles (22) to and from a position in which said articles rest on their edges approximately vertically in said frame (3), said device comprising a tilting table (8) which is located next to said frame (3), said tilting table (8) including a support wall (13), said support wall being vertically swingable about a horizontal axis (14), an elongated horizontal beam (19) on said support wall (13), said beam (19) being horizontally movable lengthwise of itself on and relative to said support wall (13) to and from a position in which said beam extends across said frame (3), vacuum suction boxes (21) on said beam (19), and means to move said vacuum suction boxes (21) perpendicularly to the plane of said support wall (13), whereby the device can add or remove a single said plate-shaped article to or from the frame by pivoting the plate-shaped article toward or away from adjacent plate-shaped articles for addition to or removal from said adjacent plate-shaped articles.

2. A device according to claim 1, further comprising support rollers (17) on a lower portion of said support wall (13) for rollingly supporting plate-shaped articles (22) on edge.

3. A device according to claim 1, further comprising conveyor belts (15) on said support wall (13) for conveying plate-shaped articles (22) supported on their side by said conveyor belts (15).

4. A device according to claim 1, further comprising a support strip extending along a lower longitudinal edge of said support wall (13) for supporting lower edges of said plate-shaped articles (22).

5. A device according to claim 4, further comprising support rollers (17) on said support strip.

* * * * *